S. PARKER.
EXTENSIBLE FORK.
APPLICATION FILED JULY 6, 1914.
1,121,657. Patented Dec. 22, 1914.
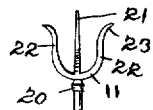
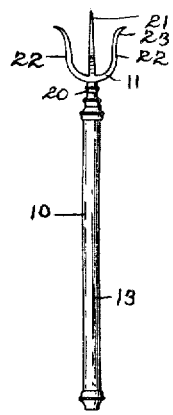
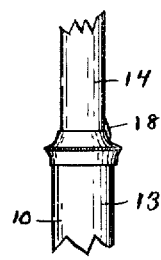
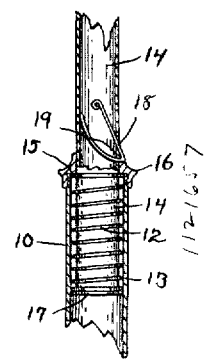
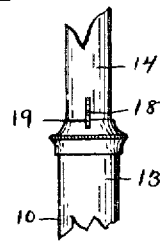
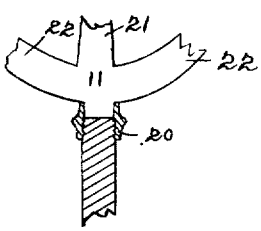
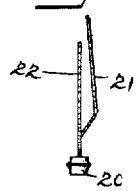
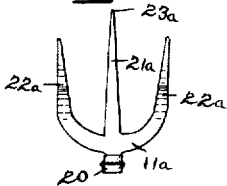
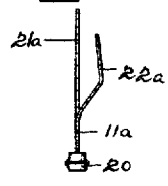
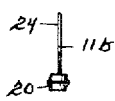
Witnesses:
R. W. Edwards
H. C. Kingsley
Inventor:
Stanley Parker
By Louis M. Schmidt
Atty.

UNITED STATES PATENT OFFICE.

STANLEY PARKER, OF NEW BRITAIN, CONNECTICUT.

EXTENSIBLE FORK.

1,121,657.

Specification of Letters Patent.

Patented Dec. 22, 1914.

Application filed July 6, 1914. Serial No. 849,360.

*To all whom it may concern:*

Be it known that I, STANLEY PARKER, a citizen of the United States, residing at New Britain, in the county of Hartford and State of Connecticut, have invented certain new and useful Improvements in Extensible Forks, of which the following is a specification.

My invention relates to improvements in extensible household implements, and the object of my improvement is to produce an implement having an extensible handle and which may be provided interchangeably with different implements having the character of a fork, suitable for use for toasting and the like and which may in particular be adapted for use with a fire place or open grate.

In the accompanying drawing:—

Figure 1 is a side elevation of my improved extensible household implement showing one style of fork. Fig. 2 is a similar view of the same in the closed position. Fig. 3 is a side elevation of part of the same showing one of the joints, and on an enlarged scale. Fig. 4 is a front elevation of the same. Fig. 5 is a sectional view of the line x x of Fig. 4. Fig. 6 is a sectional view showing the separable connection for the implement proper. Fig. 7 is an edge view, on a reduced scale, of the implement proper shown in Fig. 1. Fig. 8 is a side elevation of a different form of implement from that shown in Fig. 1. Fig. 9 is an edge view of the same. Fig. 10 is a side elevation of another modification of the implement. Fig. 11 is an edge view of the same.

My improved extensible household implement comprises a handle 10 and an implement 11 at one end thereof. The handle 10 is made up of a series of elements connected by telescoping joints having certain special features to be described. The said joints comprise a spring 12 positioned between the outer element or member 13 and the inner member 14, having one end in abutment with an annular shoulder 15 on the inner face of the collar 16 that closes the end of the outer member 13 and the other end in abutment with the enlarged head 17 provided on the end of the inner member 14. The spring 12 tends to draw the inner member 14 inwardly within the outer member 13, toward the closed position. Opposed to the spring 12 is a spring latch 18, which is operatively mounted in a slot in the inner member 14, and which is suitably positioned to engage with the outer side of the collar 16 and thereby prevents the inner member 14 from being drawn inwardly by the spring 12. Therefore, the spring latch 18 serves to hold the members positively in the extended position.

In order to hold the members in non-rotative relation the one to the other I provide a slot 19 in the outer end portion of the collar 16 that is a fit for and suitable to receive the nose of the spring latch 18. By depressing the spring latch 18 the same may be entered within the outer member 13 and the members may be brought to the closed position.

In order to open the handle and bring the parts to the proper operative position the members are pulled outwardly relatively to one another until the spring latch engages with the outer end of the collar 16 and then the members are rotated relatively the one to the other until the spring latch 18 registers with the slot 19, when the same will drop to the engaging position therein.

The particular implement 11 shown in Fig. 1 is a bread toaster and is removably connected to the handle 10 by a screw connection 20, and for engaging with and securing the bread the same is provided with a plurality of prongs as shown. The said prongs comprise a middle prong 21 and a pair of lateral prongs 22, one on each side thereof. The lateral prongs 22 are in an axial plane and have the outer ends 23 curled outwardly, laterally, suitably to provide an extended bearing surface. The middle prong 21 has a relatively sharp point; projects appreciably forward of the ends of the lateral prongs 22; is off-set a slight distance from the plane of the said lateral members 22; and is preferably directed at a slight angle relatively thereto as shown in Fig. 7. The angular relation of the prongs serves to effect a pinching or binding effect of the prongs on the bread.

In the modification shown in Figs. 8 and 9 the implement 11ª is also a bread toaster and the same differs from the toaster 11 in that the middle prong 21ª is straight and in line with the axis and lateral prongs 22ª are off-set relatively thereto, and also are normally directed at a slight angle. Also, the lateral prongs 22ª have sharp points 23ª at the ends, suitable to enter the bread in lieu of the laterally directed ends 23 shown in Fig. 1.

In the modification shown in Figs. 10 and 11 the implement 11<sup>b</sup> has two straight prongs 21, relatively short, and spaced a short distance apart, and the same is adapted for use as a marshmallow toaster.

It is obvious that other forms of implements may be used interchangeably with the handle 10. In some of these, as for instance, the bread toaster, it is a distinct advantage to have the device so constructed, either in the manner shown, or in some manner equivalent thereto, that the handle members will be held positively in non-rotation relation, so that the member to which the implement is connected will not turn relatively to the handle member at the other or butt end of the handle, and which latter really serves as the handle proper.

I claim as my invention:—

In combination in an extensible household implement, a handle portion in the form of a fork and an implement portion removably connected to one end thereof, and the said handle portion being composed of a series of telescoping elements connected together, and the means for connecting the said elements serving to positively hold the said elements against endwise displacement and also in non-rotative relation.

STANLEY PARKER.

Witnesses:
MARGARET A. GORMAN,
W. J. WORAM, Jr.

Corrections in Letters Patent No. 1,121,657.

It is hereby certified that in Letters Patent No. 1,121,657, granted December 22, 1914, upon the application of Stanley Parker, of New Britain, Connecticut, for an improvement in "Extensible Forks," errors appear in the printed specification requiring correction as follows: Page 2, lines 24–25, strike out the words "in the form of a fork"; same page, line 25, after the word "portion" insert the words *in the form of a fork;* and that the said Letters Patent should be read with these corrections therein that the same may conform to the record of the case in the Patent Office.

Signed and sealed this 2nd day of March, A. D., 1915.

[SEAL.]

J. T. NEWTON,
*Acting Commissioner of Patents.*